United States Patent [19]

Fukahori et al.

[11] 4,332,918
[45] Jun. 1, 1982

[54] NITRILE RUBBER COMPOSITION HAVING HIGH MODULUS

[75] Inventors: Yoshihide Fukahori; Nobuyuki Kataoka, both of Kodaira; Shiro Anzai, Higashimurayama, all of Japan

[73] Assignee: Bridgestone Tire Co., Ltd., Tokyo, Japan

[21] Appl. No.: 243,319

[22] Filed: Mar. 13, 1981

Related U.S. Application Data

[63] Continuation-in-part of Ser. No. 164,755, Jun. 30, 1980, abandoned, which is a continuation of Ser. No. 30,809, Apr. 17, 1979, abandoned.

[51] Int. Cl.$^3$ ............................................. C08F 265/08
[52] U.S. Cl. ...................................... 525/259; 525/301
[58] Field of Search ............... 525/301, 367, 368, 369, 525/371, 372, 373, 379, 382, 386, 259

[56] References Cited

U.S. PATENT DOCUMENTS

| | | | |
|---|---|---|---|
| 2,724,707 | 11/1955 | Brown | 526/47.8 |
| 3,403,136 | 9/1968 | Baker | 526/47.8 |
| 3,607,981 | 9/1971 | Morris | 260/879 |

Primary Examiner—Paul R. Michl
Attorney, Agent, or Firm—Sughrue, Mion, Zinn, Macpeak and Seas

[57] ABSTRACT

A method of preparing a nitrile rubber composition having modulus and excellent physical properties and abrasion resistance is disclosed. This composition is prepared by kneading at 120°–160° C. (a) a nitrile rubber, (b) an $\alpha,\beta$-ethylenically unsaturated carboxylic acid, (c) a divalent metal compound, (d) a secondary aryl amine, cooling the kneaded mass below 100° C., adding to the kneaded mass (e) an organic peroxide, and heating and curing the resulting mixture at 110°–180° C. The addition of the secondary aryl amine considerably improves the physical properties of the composition. These compositions have not a tendency of scorching and are superior in the workability as compared with conventional carboxylated nitrile rubber compositions produced by emulsion polymerization.

5 Claims, No Drawings

NITRILE RUBBER COMPOSITION HAVING HIGH MODULUS

REFERENCE TO RELATED APPLICATION

This application is a continuation-in-part of application Ser. No. 164,755, filed June 30, 1980, now abandoned, which in turn was a continuation of application Ser. No. 30,809, filed Apr. 17, 1979, now abandoned.

BACKGROUND OF THE INVENTION

1. Field of the Invention

The present invention relates to a method of preparing nitrile rubber compositions having high modulus. The compositions according to the present invention have not only excellent oil resistance and high-temperature performances, but also improved physical properties and abrasion resistance as compared with conventional nitrile rubber compositions.

2. Description of the Prior Art

Recently, it has been demanded to develop rubbers having high modulus, excellent physical properties and abrasion resistance, particularly rubbers exhibiting excellent durability in oil or water or under severe abrading conditions.

In sulfur-curable rubber compositions, it is generally known that the crosslinking density is increased by high loading of carbon black or by increasing the amount of sulfur added in order to produce a rubber having high modulus. In this case, however, the physical properties are apt to lower and particularly, the lowering of elongation at break and flexing fatigue resistance becomes conspicuous.

Further, polyurethane rubbers have been known as an elastomer having high modulus. However, the polyurethane rubbers have various drawbacks, for example, the cost of the raw materials is high, the curing time is long, the physical properties at a low temperature are poor, the heat resistance is poor, and the abrasion resistance, flexing fatigue resistance and heat evolution characteristics are insufficient, so that the products produced from the polyurethane rubbers are not satisfactory as an industrial usage and the development of the other suitable materials has been demanded.

On the other hand, there have been known carboxylated nitrile rubber compositions, in which carboxyl group is directly added to a main chain of nitrile rubber, as a rubber composition having an oil resistance and a relatively high modulus. However, these compositions are apt to be scorched under usual compounding conditions. In order to prevent the scorching, there have been proposed various methods, one of which is the use of zinc oxide encapsulated with zinc sulfide or zinc phosphate in the curing (C. L. Bryant, *Januarl of IRI*, 1970, p. 202) and the other of which is the use of zinc peroxide (R. J. Weir and W. D. Gunter, *European Rubber Journal*, 1978, p. 20). In these methods, however, there are such drawbacks that the cost becomes expensive and the properties of the resulting composition are apt to lower.

Moreover, a method of producing elastic rubber compositions, wherein carboxy-containing polymer obtained by emulsion polymerization of diene monomer with methacrylic acid or by reaction of diene polymer with maleic anhydride (in this case, carboxyl group is bonded to the polymer main chain) is cured with a polyvalent metallic oxide such as zinc oxide or the like, has been described in U.S. Pat. No. 2,724,707. In this elastic rubber composition, however, the polymer main chains are connected to each other by ionic bonding through carboxyl group, so that the modulus and physical properties are not yet sufficient as an industrial usage.

SUMMARY OF THE INVENTION

It is an object of the present invention to provide a method of preparing a novel nitrile rubber composition having high modulus.

It is another object of the present invention to provide a method of preparing a high modulus and oil resistant rubber composition having improved physical properties and abrasion resistance.

It is a further object of the present invention to provide a method of preparing a high modulus and oil resistant rubber composition having a good workability without scorching.

It is a still further object of the present invention to provide a method of preparing a high modulus and oil resistant rubber composition having an excellent water resistance as compared with the conventional polyurethane elastomer.

According to the present invention, there is provided a method of preparing novel nitrile rubber compositions having high modulus which comprises kneading (a) a nitrile rubber, (b) an $\alpha,\beta$-ethylenically unsaturated carboxylic acid, (c) a divalent metal compound, and (d) a secondary aryl amine at 120°–160° C., cooling the kneaded mass below 100° C., adding (e) an organic peroxide thereto and then curing the resulting mixture at 110°–180° C.

The compositions according to the present invention have advantages that they are comparatively cheap owing to the use of ordinary nitrile rubber and chemical reagents and easy in workability.

DESCRIPTION OF THE PREFERRED EMBODIMENT

The nitrile rubber used in the practice of the invention as the component (a) may include butadiene-acrylonitrile copolymer, isoprene-acrylonitrile copolymer, pentadiene-acrylonitrile copolymer, chloroprene-acrylonitrile copolymer and the like. These random copolymers and alternating copolymers may also be used as a mixture of them and further may contain a small amount of other elastomer such as natural rubber, polyisoprene rubber, polybutadiene rubber, butadiene-styrene copolymer, butyl rubber, ethylene-propylenediene terpolymer and the like.

The $\alpha,\beta$-ethylenically unsaturated carboxylic acid used in the invention as the component (b) may include methacrylic acid, ethacrylic acid, acrylic acid, cinnamic acid, crotonic acid, maleic acid, fumaric acid, itaconic acid, and the like. Methacrylic acid is preferably used. The weight ratio of the component (a) to the component (b) should be in the range of 100/10–100/40, preferably 100/15–100/35. The rubber compositions including the component (a) of more than the specified range are impractical because of its lower hardness. The compositions including the component (a) of less than the specified range are, on the contrary, too hard and brittle for the practical usage. Further, unsaturated acid esters of the component (b) with multifunctional alcohols, such as trimethylol propane trimethacrylate, may be employed together with the component (b) in the scope of the invention.

The divalent metal compounds used in the invention as the component (c) may include the compounds of zinc, magnesium, calcium, iron, cobalt and the like. The component (c) used in the invention may include the oxides, hydroxides and carbonates of these metals. Zinc oxide, especially activated zinc oxide is preferably used. The component (c) should be employed in quantities enough to neutralize all the carboxyl groups in the component (b). The composition thus may be changeable according to the kind of the component (b), that is, a species of metal or the form of metal compound; the component (c) may be generally employed in a quantity of 50 to 150 parts by weight, preferably 75 to 125 parts by weight per 100 parts by weight of the component (b). When the component (c) is compounded in a too large amount, especially, the elongation at break decreases.

According to the present invention, the components (b) and (c) may be separately mixed with the other components, or a reaction mixture of the components (b) and (c) may be mixed with the other components. In the latter case, it is preferable to use a reaction product obtained by reacting the component (b) with the component (c) under anhydrous condition, for example, a substantially anhydrous powdery product obtained by reacting the components (b) and (c) in a sufficiently dehydrated n-hexane and drying the resulting product under vacuum.

The secondary aryl amine as the component (d) is used with the object of improving the mechanical properties of the composition. The addition effect of the component (d) in the composition according to the present invention is fairly conspicuous as compared with the case of using rubber other than nitrile rubber (e.g. BR, IR). The secondary aryl amines preferably used in the invention include N-phenyl-N'-isopropyl-p-phenylene diamine, diphenylamine, N,N'-diaryl-p-phenylene diamines, N-(3-methacryloyloxy-2-hydroxypropyl)-N'-phenyl-p-phenylene diamine and the like.

Moreover, in order to enhance the addition effect of the component (d), it is preferable to use the secondary aryl amine together with an amine-ketone based compound such as polymerized 1,2-dihydro-2,2,4-trimethyl quinoline, 6-ethoxy-1,2-dihydro-2,2,4-trimethyl quinoline, condensation product of acetone with diphenylamine and the like.

According to the invention, the component (d) is used in a quantity of 0.1 to 4.0 parts by weight, preferably 0.3 to 3.0 parts by weight based on 100 parts by weight of the component (a). Generally, it is known that the presence of amine considerably obstructs the radical crosslinking reaction of the compounded mixture because active species of the radical become inactivate due to the reaction with the amine. According to the invention, however, it is surprisingly found that the presence of the amine considerably improves the physical properties of the resulting rubber composition as compared with the case of adding no amine. When the amount of the component (d) is smaller than 0.1 part by weight, the addition effect cannot be expected, while when the amount exceeds 4.0 parts by weight, the modulus of the resulting composition lowers considerably.

The organic peroxides used in the invention as the component (e) may include dialkyl peroxides exemplified as below; dicumyl peroxide, di-t-butyl peroxide, 2,5-dimethyl-2,5-di-t-butylperoxy hexane, α,α'-bis-t-butylperoxy-p-diisopropylbenzene, 1,1-di-t-butylperoxy-3,3,5-trimethylcyclohexane and the like. Dicumyl peroxide and 1,1-di-t-butylperoxy-3,3,5-trimethylcyclohexane are generally used. The component (e) may be generally employed in a quantity of 0.3 to 5.0 parts by weight, preferably 1.0 to 4.0 parts by weight per 100 parts by weight of the component (a).

In the composition according to the invention, the following components may be added in addition to the above mentioned components (a)-(e).

The carboxylic acids which are unpolymerizable and/or uncrosslinkable component may be employed for the purpose of further improving the physical properties, such as tensile strength, elongation and flexing fatigue resistance of the composition in the invention. This compound which may be preferably used includes, the saturated aliphatic carboxylic acids, such as acetic acid, butyric acid, lauric acid, palmitic acid, stearic acid and the like, higher unsaturated aliphatic carboxylic acids, such as oleic acid and the like, alicyclic carboxylic acids such as naphthenic acid and aryl carboxylic acids, such as benzoic acid. This compound also may be used in the form of any metal salt. The metals of metal salts generally used include zinc, calcium, magnesium, aluminum, sodium and cobalt as examples. The improvement of the physical properties is recognized as addition of this compound of 1.5 to 17 parts by weight based on 100 parts by weight of component (a).

The rubber compositions according to the invention may be incorporated with a suitable carbon black according to circumstances for improvement of its weather-proofing properties.

High Abrasion Furnace (HAF) Black, HAF-Low Structure (LS) Black, and HAF-High Structure (HS) Black are preferably used as carbon blacks, although other blacks which may be commonly used in rubber industries are unrestrictedly employed. Carbon black is incorporated in a quantity of less than 50%, preferably 5 to 30% by weight of the component (a) in view of workability.

Other conventional fillers, such as silica, sulfur, p-quinone dioxime and the like, which are added to the common rubber compositions also may be properly used.

According to the present invention, the components other than the component (e) are first thoroughly kneaded by means of a Banbury mixer, a mixing roll or the like, whereby the components (b) and (c) are filled in three-dimensional spaces defined by the main chains of the component (a). In this case, if the kneading temperature is lower than 100° C., the kneaded mass is apt to adhere to the surface of the roll, the inner surface of the Banbury mixer or the like, so that the kneading temperature is set to 120°-160° C., whereby the kneading operation can easily be performed without any troubles. After the cooling below 100° C., the kneaded mass is mixed with the component (e) and then cured by heating. Curing of the mixture is usually carried out at 110°-180° C.

As mentioned above, the present invention makes it possible to produce nitrile rubber compositions having high modulus and excellent physical properties because the components (b) and (c) are kneaded into the three-dimensional spaces defined by the main chains of the component (a) without reacting with the component (a).

The following examples illustrate more fully the scope of the invention.

EXAMPLE 1, COMPARATIVE EXAMPLES 1, 2

To 100 parts of butadiene-acrylonitrile copolymer rubber (hereinafter abbreviated as NBR, acrylonitrile content: 35%, made by Japan Synthetic Rubber Co., Ltd.) as the component (a) were added 30 parts of methacrylic acid (hereinafter abbreviated as MAA) as the component (b), 30 parts of activated zinc oxide (hereinafter abbreviated as A-ZnO) as the component (c), 20 parts of carbon black (HAF-LS), 3 parts of stearic acid, 0.8 part of polymerized 1,2-dihydro-2,2,4-trimethyl quinoline (hereinafter abbreviated as polymerized-TMQ) and an amount shown in the following Table 1 of N-phenyl-N'-isopropyl-p-phenylene diamine (hereinafter abbreviated as IPPD) as the component (d) and then the resulting mixture was mixed at 140° C. by means of an open roll. The mixture after cooled below 70° C. was added and kneaded with 1.2 parts of dicumyl peroxide (hereinafter abbreviated as DCPO) as the component (e) at about 70° C. and then charged into a slab mold, where the resulting mixture was heated and cured at 155° C. for 60 minutes to form a slab sheet with a thickness of 2 mm.

When a sample cut out from the resulting slab sheet was swollen with dimethylformamide for 48 hours and then extracted with acetone containing hydrochloric acid, about 40% of the charge weight of methacrylic acid was separated in the form of methacrylic polymer. In other words, it is considered that about 60% of the charged methacrylic acid is bonded to the component (a) in graft form.

The same procedure as described above was applied to the rubber composition containing no component (d) and conventional sulfur curable NBR composition to form slab sheets.

The properties of these slab sheets were measured to obtain a result as shown in Table 1.

TABLE 1

| Compounding recipe (part) | Example 1 | Comparative Example 1 | Comparative Example 2 |
|---|---|---|---|
| NBR | 100 | 100 | 100 |
| MAA | 30 | 30 | — |
| A-ZnO | 30 | 30 | — |
| ZnO | — | — | 5 |
| Carbon black (HAF-LS) | 20 | 20 | — |
| Carbon black (ISAF) | — | — | 30 |
| Carbon black (SRF) | — | — | 90 |
| Stearic acid | 3 | 3 | 1 |
| Polymerized-TMQ | 0.8 | 0.8 | — |
| Sulfur | — | — | 1.8 |
| Dibenzothiazole disulfide | — | — | 1.7 |
| DCPO | 1.2 | 1.2 | — |
| Dioctyl phthalate | — | — | 20 |
| IPPD | 1.0 | — | 1.5 |
| JIS hardness (degree) | 90 | 91 | 83 |
| $E_{10}$ (Young's modulus, kg/cm$^2$) | 363 | 389 | 104 |
| Tensile strength at break (kg/cm$^2$) | 349 | 247 | 141 |
| Elongation at break (%) | 265 | 140 | 182 |

The results of Table 1 show that the rubber composition according to the invention is considerably superior in the physical properties of the conventional NBR rubber composition and that the presence of the secondary aryl amine as the component (d) largely contributes to improve the physical properties.

EXAMPLES 2-3, COMPARATIVE EXAMPLE 3

The same procedure as described in Example 1 was repeated except that the amounts of the components (b) and (c) were changed as shown in the following Table 2. Under the same condition, the experiment was made with respect to the composition containing no secondary aryl amine as the component (d). The compounding recipe of the composition and properties of the resulting slab sheet are shown in Table 2.

TABLE 2

| Compounding recipe (part) | Example 2 | Example 3 | Comparative Example 3 |
|---|---|---|---|
| NBR | 100 | 100 | 100 |
| MAA | 10 | 20 | 20 |
| A-ZnO | 10 | 20 | 20 |
| Carbon black (HAF-LS) | 20 | 20 | 20 |
| Stearic acid | 3 | 3 | 3 |
| Polymerized-TMQ | 1 | 1 | 0 |
| DCPO | 1.6 | 1.6 | 3.2 |
| IPPD | 1 | 1 | 0 |
| JIS Hardness (degree) | 68 | 78 | 90 |
| Tensile strength at break (kg/cm$^2$) | 347 | 328 | 161 |
| Elongation at break (%) | 490 | 400 | 102 |

EXAMPLE 4

About 10 kg of NBR was mixed with the other components in the compounding recipe having substantially the same proportion as described in Example 1 by means of a Banbury mixer to form a kneaded mass. In this case, scorching was not caused at all and the workability was good. The kneaded mass was cured in a slab mold at 160° C. for 40 minutes to form a slab sheet having a JIS hardness of 88°, a Young's modulus ($E_{10}$) of 293 kg/cm$^2$, a tensile strength at break ($T_B$) of 278 kg/cm$^2$ and an elongation at break ($E_B$) of 289%.

When the slab sheet was subjected to an aging test at 100° C. for 96 hours, the retention of $T_B$ was 99%. Further, when the slab sheet was subjected to an oil resistant test by immersing in JIS No. 3 oil at 70° C. for 96 hours, the retentions of $T_B$ and $E_B$ were 78% and 84%, respectively, which were substantially the same as those of the conventional NBR composition. Moreover, when subjecting to a waterproof test at 70° C. for 96 hours, the retention of $T_B$ was 64%, which was higher than that of the polyurethane rubber (55%).

EXAMPLE 5

The same procedure as described in Example 1 was repeated by using 100 parts of the same NBR as described in Example 1 as the component (a), 15 parts of MAA as the component (b), 15 parts of A-ZnO as the component (c), 20 parts of carbon black (HAF-LS), 3 parts of stearic acid, 2 parts of N-(3-methacryloyloxy-2-hydroxypropyl)-N'-phenyl-p-phenylene diamine as the component (d) and 4 parts of DCPO as the component (e) to form a kneaded mass, which was heated and cured at 155° C. for 60 minutes. The resulting product had a JIS hardness of 82°, an $E_{10}$ of 138 kg/cm$^2$, a $T_B$ of 209 kg/cm$^2$ and an $E_B$ of 256%.

When the product was subjected to an abrasion resistant test using a Lambourn abrasion tester at 42.5 m/min/50 m/min under a load of 3 kg, the abrasion resistance was about 3.5 times of that of the conventional NBR composition having the same hardness as described above.

EXAMPLE 6, COMPARATIVE EXAMPLES 4, 5, 6

The same procedure as described in Example 1 was repeated by using NBR as the component (a), MAA as the component (b), A-ZnO as the component (c), DCPO as the component (e), IPPD as the component (d) and polymerized-TMQ in a compounding recipe as shown in the following Table 3 and further adding 20 parts by weight (based on 100 parts by weight of NBR) of carbon black (HAF) and 3 parts by weight (based on 100 parts by weight of NBR) of stearic acid to form a slab sheet with a thickness of 2 mm.

Similarly, a slab sheet was prepared in the same manner as described above except that butyl rubber (BR) was used as the component (a) instead of NBR.

The properties of these slab sheets were measured to obtain a result as shown in Table 3.

confirmed that maleic acid is almost bonded to the polymer.

The Sample A or NBR was compounded with the other components defined by the present invention according to a compounding recipe as shown in the following Table 4 and then charged into a slab mold, where the resulting mixture was heated and cured at 155° C. for 60 minutes to form a slab sheet. The properties of the resulting slab sheet are also shown in Table 4.

TABLE 3

| Compounding recipe (part) | Comparative Example 4 | Example 6 | Compounding recipe (part) | Comparative Example 5 | Comparative Example 6 |
|---|---|---|---|---|---|
| IPPD/NBR + MAA | 0/100 | 0.8/100 | IPPD/BR + MAA | 0/100 | 0.5/100 |
| MAA/NBR | 20/80 | 23/77 | MAA/BR | 20/80 | 20/80 |
| A-ZnO/MAA | 100/100 | 100/100 | ZnO/MAA | 75/100 | 75/100 |
| DCPO/NBR + MAA | 1.3/100 | 1.2/100 | DCPO/BR + MAA | 1.0/100 | 1.4/100 |
| Polymerized-TMQ/NBR + MAA | 0.8/100 | 0.8/100 | | | |
| JIS hardness | 91° | 90° | JIS hardness | 83° | 84° |
| Tensile strength at break (kg/cm$^2$) | 247 | 349 | Tensile strength at break (kg/cm$^2$) | 232 | 240 |
| Rate of increase (%) | 100 | 141 | Rate of increase (%) | 100 | 103 |
| Elongation at break (%) | 140 | 265 | Elongation at break (%) | 355 | 370 |
| Rate of increase (%) | 100 | 189 | Rate of increase (%) | 100 | 104 |

TABLE 4

| Compounding recipe (part) | Comparative Example 7 | Comparative Example 8 | Example 7 | Comparative Example 9 |
|---|---|---|---|---|
| Sample A | 100 | 100 | — | — |
| NBR | — | — | 100 | 100 |
| MAA *1 | — | — | 10 | 10 |
| Activated-ZnO | 10 | 10 | 10 | 10 |
| Carbon black (HAF-LS) | 20 | 20 | 20 | 20 |
| Stearic acid | 3 | 3 | 3 | 3 |
| DCPO *2 | 4 | 4 | 4 | 4 |
| IPPD *3 | 1 | 0 | 1 | 0 |
| Hd (JIS hardness, degree) | 55 | 56 | 68 | 72 |
| $E_{10}$ (Young's modulus, kg/cm$^2$) | 42 | 50 | 66 | 75 |
| $T_B$ (Tensile strength at break, kg/cm$^2$) | 105 | 110 | 347 | 240 |
| $E_B$ (Elongation at break, %) | 520 | 530 | 490 | 280 |

Note:
*1 methacrylic acid
*2 dicumyl peroxide
*3 N-phenyl-N'-isopropyl-p-phenylene diamine The results of Table 3 show that the addition effect of the component (d) is largely conspicuous in case of using NBR rather than the case of using BR as the component (a) with respect to the tensile strength at break and elongation at break.

EXAMPLE 7, COMPARATIVE EXAMPLES 7, 8, 9

The following experiment was made in order to compare the product prepared by the method of the invention with the carboxylated rubber obtained by reacting NBR with maleic anhydride.

100 g of butadiene-acrylonitrile copolymer rubber (hereinafter abbreviated as NBR, acrylonitrile content: 35%, made by Japan Synthetic Rubber Co., Ltd.) was dissolved in 1.5 l of chloroform, to which were added 10 g of maleic acid anhydride and 0.04 g of benzoic peroxide and then the resulting mixture was agitated in a nitrogen stream at 80° C. for 3 hours. Then, the mixture was poured into a large amount of methanol to precipitate a reaction product, which was filtered off, thoroughly washed with water and dried to obtain a graft polymer of NBR-maleic acid (hereinafter referred to as Sample A). As a result of analysis, it has been As apparent from Table 4, the rubber compositions of Comparative Examples 7 and 8 containing the Sample A are fairly poor in the tensile strength at break as compared with the rubber composition of Example 7 according to the present invention. Moreover, there is no difference in the properties between Comparative Example 7 and Comparative Example 8 independently of the presence of IPPD, while there is a great difference in the tensile strength at break and elongation at break between Example 7 and Comparative Example 9 due to the presence of IPPD. From these facts, it can be seen that according to the present invention, the presence of secondary aryl amine largely contributes to improve the physical properties of the nitrile rubber composition.

EXAMPLE 8, COMPARATIVE EXAMPLE 10

A commercially available carboxylated NBR (acrylonitrile content: 35%, 0.13 ephr.—COOH) was compared with the product according to the present invention. In such a carboxylated NBR, most of carboxyl groups were bonded to the polymer, while only about 60% of carboxyl group was bonded in the product according to the present invention. This carboxylated NBR was mixed with the recipe of Comparative Example 10 shown in the following Table 5 and cured by heating at 155° C. for 60 minutes. (In Comparative Example 10, when only the zinc oxide is used instead of zinc peroxide, scorching is caused in several minutes and the properties of the resulting product are considerably degraded). Similarly, the rubber composition according to the present invention having a compounding recipe of Example 8 of Table 5 was cured under the same conditions as described above.

The properties of each of the resulting cured products were measured to obtain a result as shown in Table 5.

TABLE 5

| Compounding recipe (part) | Comparative Example 10 | Example 8 |
| --- | --- | --- |
| Carboxylated NBR | 100 | — |
| NBR | — | 100 |
| Carbon black (HAF-LS) | 40 | 20 |
| MAA | — | 25 |
| Stearic acid | 1 | 3 |
| Sulfur | 1.5 | — |
| Zinc peroxide *1 | 5 | — |
| Activated-ZnO | — | 25 |
| TS *2 | 0.4 | — |
| Polymerized-TMQ *3 | — | 1 |
| DCPO | — | 4 |
| IPPD | — | 1 |
| Hd (°) | 86 | 90 |
| Modulus 100% (kg/cm$^2$) | 62 | 141 |
| Modulus 200% (kg/cm$^2$) | 167 | 239 |
| $T_B$ (kg/cm$^2$) | 215 | 284 |
| $E_B$ (%) | 235 | 245 |

Note:
*1 ZnO$_2$: 72.5%, made by Kanto Chemical Co., Ltd. (ZnO: 27.5%)
*2 tetramethyl thiuram monosulfide
*3 polymerized-1,2-dihydro-2,2,4-trimethyl quinoline From the data of Table 5, it can be seen that the properties of the rubber composition according to the present invention are considerably superior to those of Comparative Example 10. Moreover, it has been confirmed that in Example 8, the kneadability is good and there is caused no scorching.

EXAMPLE 9, COMPARATIVE EXAMPLES 11, 12

This experiment shows that two kinds of the amines other than that of the present invention are entirely different from the secondary aryl amine according to the present invention in the performance and effect.

The properties of the nitrile rubber composition having a compounding recipe shown in the following Table 6 were measured in the same as described above to obtain a result as shown in Table 6.

TABLE 6

| Compounding recipe (part) | Comparative Example 11 | Comparative Example 12 | Example 9 |
| --- | --- | --- | --- |
| NBR | 100 | 100 | 100 |
| MAA | 30 | 30 | 30 |
| Activated-ZnO | 30 | 30 | 30 |
| Carbon black (HAF-LS) | 20 | 20 | 20 |
| Stearic acid | 3 | 3 | 3 |
| Polymerized-TMQ | 0.8 | 0.8 | 0.8 |
| DCPO | 1.2 | 1.2 | 1.2 |
| IPPD | — | — | 1.0 |
| Dimethylaniline | — | 1.0 | — |
| Hd | 92 | 91 | 90 |
| $E_{10}$ (kg/cm$^2$) | 395 | 380 | 360 |
| $T_B$ (kg/cm$^2$) | 240 | 243 | 355 |
| $E_B$ (%) | 135 | 150 | 270 |

From the data of Table 6, it can be seen that when Comparative Example 12 using dimethylaniline, which is a redox catalyst for addition reaction of acrylonitrile, is compared with Comparative Example 11 using no dimethylaniline, there is no difference in the properties of the nitrile rubber composition between Comparative Example 11 and Comparative Example 12. This fact shows that the use of dimethylaniline does not contribute to improve the properties of the nitrile rubber composition.

On the other hand, when Comparative Examples 11 and 12 are compared with Example 9 corresponding to the nitrile rubber composition of the present invention, it is obvious that the secondary aryl amine to be used in the present invention largely contributes to improve the properties, particularly, tensile strength at break and elongation at break of the nitrile rubber composition.

What is claimed is:

1. A method of preparing a nitrile rubber composition having high modulus and excellent physical properties and abrasion resistance, which comprises kneading at a temperature of 120°–160° C.
    (a) a nitrile rubber,
    (b) an α,β-ethylenically unsaturated carboxylic acid, wherein the ratio by weight of the component (a) to the component (b) is 100/10 to 100/40,
    (c) a divalent metal compound being present in a quantity of 50 to 150 parts by weight per 100 parts by weight of the component (b), and
    (d) a secondary aryl amine being present in a quantity of 0.1 to 4.0 parts by weight per 100 parts by weight of the component (a);
cooling the kneaded mass below 100° C.;
adding to the kneaded mass
    (e) an organic peroxide being present in a quantity of 0.3 to 5.0 parts by weight per 100 parts by weight of the component (a); and
heating and curing the resulting mixture at a temperature of 110°–180° C.

2. The method according to claim 1, wherein the α,β-ethylenically unsaturated carboxylic acid is methacrylic acid.

3. The method according to claim 1, wherein the organic peroxide is selected from the class consisting of dicumyl peroxide and 1,1-di-t-butylperoxy-3,3,5-trimethyl cyclohexane.

4. The method according to claim 1, wherein the secondary aryl amine is selected from the class consisting of N-phenyl-N′-isopropyl-p-phenylene diamine and N-(3-methacryloyloxy-2-hydroxypropyl)-N′-phenyl-p-phenylene diamine.

5. The method according to claim 1, wherein the divalent metal compound is selected from the class consisting of zinc oxide and activated zinc oxide.

* * * * *